INVENTOR.
LLOYD M. MOORE

April 28, 1970 L. M. MOORE 3,509,304
ELECTROEROSIVE MACHINING OF SPINNERET CAPILLARIES
USING ALTERNATING CURRENT
Filed Aug. 30, 1967 2 Sheets-Sheet 2

INVENTOR.
LLOYD M. MOORE
BY
Stanley M. Tarter
ATTORNEY 3,509,304
ELECTROEROSIVE MACHINING OF SPINNERET CAPILLARIES USING ALTERNATING CURRENT
Lloyd M. Moore, Pensacola, Fla., assignor to Monsanto Company, St. Louis, Mo., a corporation of Delaware
Filed Aug. 30, 1967, Ser. No. 664,541
Int. Cl. B23p 1/08
U.S. Cl. 219—69                     1 Claim

ABSTRACT OF THE DISCLOSURE

This invention concerns electroerosive apparatus for cutting small passages through a metal workpiece, especially a spinneret. The apparatus includes a source of alternating current with a frequency of not more than 700 cycles per second. An electrically conductive wire is reciprocatively mounted. A surface of the workpiece to be machined is juxtaposed to the wire. Means are provided for connecting the source of alternating current between said workpiece and said wire to cause a spark eroding discharge between the workpiece and the wire as the latter reciprocates. A gas containing at least 35 percent (%) free oxygen is present at the point of sparking.

BACKGROUND OF THE INVENTION

The physical characteristics of man-made filaments may be greatly altered by changing the cross-sectional shape thereof. The luster, handle, bulk, porosity, and many other properties of fabrics are modified by selecting textile filaments having a specific form of cross-section, such as Y-section, star-section, ribbon section, hollow section, etc.

The shape of a synthetic filament cross-section, particularly of a filament made by melt-spinning or by dry-spinning, is determined primarily by the shape of the orifices in the spinneret through which molten polymer or polymer solution is extruded. Under practical spinning conditions the filament section resembles the cross-section of the orifice, although sharp corners or intersections in the orifice tend to be rounded off or merged together in the filament section. To produce filaments having uniformly controlled cross-sections it is necessary, therefore, to provide spinneret capillaries having accurately controlled shapes.

In application Ser. No. 553,369, filed May 27, 1966 having inventorship and ownership in common with the present application, there are disclosed a method and apparatus for electroerosively machining a surface of a workpiece, such as a spinneret. The apparatus utilizes a source of direct current electrical energy. An electrically conductive cutting wire is connected to the negative side of the electrical energy. The connection is made to provide a parallel supply of electrical current to each of the ends of the wire. This parallel supply minimizes current flow variations due to changes in resistance set up as the wire engages in the electroerosion operation. The apparatus includes means for reciprocating the wire in proximity to a workpiece having a surface to be machined. The positive side of the electrical energy is connected to the workpiece. A spark eroding discharge is set up between the workpiece and the wire as the latter reciprocates. Means are used for discharging a free oxygen-containing gas at the point of spark discharge. To provide for progression of the electroerosive machining, means are included for moving the workpiece perpendicularly relative to the axis of the wire. It has been found that when the polarity of the spinneret workpiece is reversed so that it is negative with respect to the wire, electroerosion substantially ceases even in an oxygen-rich atmosphere. It has now been found that electroerosion proceeds at a satisfactory rate when the polarity of the workpiece is changed periodically at a rather low frequency.

SUMMARY OF THE INVENTION

In accordance with the present invention electroerosive machining is accomplished through the use of a source of alternating current with a frequency of not more than 700 cycles per second. An electrically conductive wire is reciprocatively mounted adjacent to a surface of a workpiece to be machined. Means are provided for connecting the source of alternating current between said workpiece and said wire to cause a spark eroding discharge between the workpiece and the wire as the latter reciprocates. A gas containing at least 35% free oxygen is present at the point of sparking.

BRIEF DESCRIPTION OF THE DRAWINGS

The improvements disclosed herein can be most readily understood by reference to the drawing.

In FIGURE 1 are shown two freely rotatable electrically nonconductive pulleys 1 and 2; the shafts of the pulleys are supported by a frame (not shown). Passing over these two pulleys is a fine wire 3 which forms one electrode in an electrical circuit. One end of the wire is fastened at 4 to one end of a helically coiled spring 5 that is anchored to a frame at 6, and the other end of the wire is attached to a juncture or clamp 7 which pivots about a pin attached to drive wheel 8. The drive wheel 8, pulleys 1 and 2, and anchor pin 6 are all electrically insulated from the frame; this requirement is conveniently achieved by making each of these members of nonconductive plastic material such as nylon, polystyrene, polymethacrylate, etc. Numeral 9 indicates a schematic cross-section of a metal spinneret blank having a conventional counterbore from the back side and a pilot hole through which wire electrode 3 passes. The spinneret is fastened by clamps (not shown) to a conventional precision table 10 such as commonly used with micro drill presses or milling machines; by means 11, such as micrometer screws and a rotational axis, table 10 may be shifted accurately in any direction and with it the spinneret. Of course, provision can be made for moving only the spinneret. Alternating current source (A.C.) is provided and connected between the wire 3 and spinneret 9. An ammeter A and a variable voltage auto-transformer 12 are connected between pin 6 and spinneret 9 so that the voltage is adjusted by transformer 12 to set the desired current indicated by A. The frequency of the A.C. is controlled by a frequency converter (not shown) when frequencies other than available line frequency are desired. Both ends of the wire are electrically connected through spring 5 and the loosely coiled wire 13. A short length of small-bore tubing 14, such as hypodermic tubing, is held to the frame by an adjustable clamp such that the longitudinal axis of the tube is aimed at the intersection of the wire and the face of the spinneret. Oxygen-containing gas under pressure supplied to the hypodermic tubing forms a high velocity jet that impinges directly on the wire at the region of contact between the wire and the spinneret blank.

Figure 1:
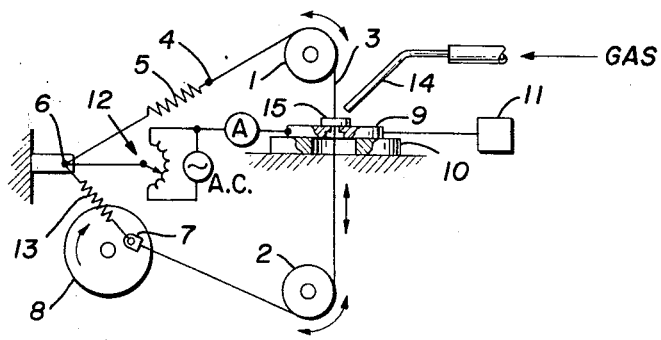
FIGURE 1 shows schematically apparatus suitable for carrying out the invention.

The mechanical operation of the apparatus shown in FIGURE 1 can be seen from the drawing. As positively driven wheel 8 rotates, pivoted clamp 7 describes a circular path; and wire 3 is moved axially between the two pulleys a distance equivalent to the diameter of the circular path. For each complete revolution of the drive wheel the wire moves first in one direction and then an equal distance in the opposite direction, or a total travel of twice the diameter of the circle of rotation of pivot 7. As the wire reciprocates and electrical sparking occurs between the wire and the spinneret blank, metal is eroded away. A template 15 of electrically nonconducting material resting on the spinneret and in contact with the wire may be used to guide the path of the spinneret relative to the wire as it is moved by precision table 10 to generate the desired orifice shape. The jet of gas from tube 14 assists mechanically by blowing eroded particles away from the active area. Precision movements and observations of the spinneret can be made with the aid of a conventional low power microscope having long working distance focused on the intersection of the wire and spinneret face.

Figure 2:
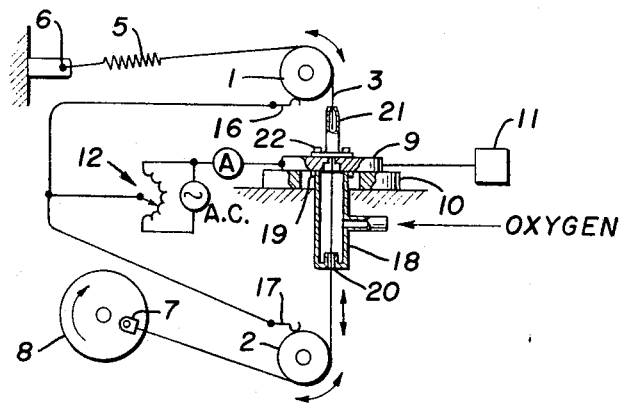
FIGURE 2 shows schematically certain desirable modifications in the apparatus illustrated in FIGURE 1.

The apparatus as indicated in FIGURE 2 effectively reduces variations in metal cutting rate, improves oxygen utilization efficiency, and substantially increases further the metal removal rate. In comparison with FIGURE 1, the two pulleys 1 and 2 are now made of electrically conducting material, preferably aluminum or silver-plated copper; pulley bearings are insulated from the frame and each pulley is connected with the A.C. source by means of spring brushes 16 and 17 bearing directly against the pulleys, or by other common expedients for making electrical connection with rotating members. Alternating current flows through the wire to the pulleys so that the effective length of wire in the electrical circuit is constant at all parts of the cycle. Oxygen is brought to the spark area by means of a tube 18 having a T branch to admit a metered stream of oxygen. A small O-ring 19 seals the tube 18 to the bottom surface of the spinneret. Wire electrode 3 passes through a small nonconductive abrasion resistant eyelet 20 that has a hole just large enough to freely pass the wire. Some oxygen delivered to tube 18 escapes at eyelet 20 but the much greater fraction is forced to pass through the capillary being cut by the wire electrode, assuring an oxygen-saturated atmosphere and high cutting efficiency. Experience shows that as the cutting operation proceeds and the capillary becomes progressively larger, a slight drop in metal removal rate occurs, presumably due to more oxygen flowing through the open area adjacent the electrode. Such channeling is reduced by placing around the wire a light, loose-fitting flanged plastic tube 21 held down by a metal ring 22 that simply rests on the flange of tube 21; this device normally is not used when a direct guide template is employed on top of the spinneret. With the arrangement shown in FIGURE 2 moderately skilled trained operators quickly attain a high degree of proficiency in aligning spinneret and electrode and are able to operate two or more machines concurrently.

Figure 3:
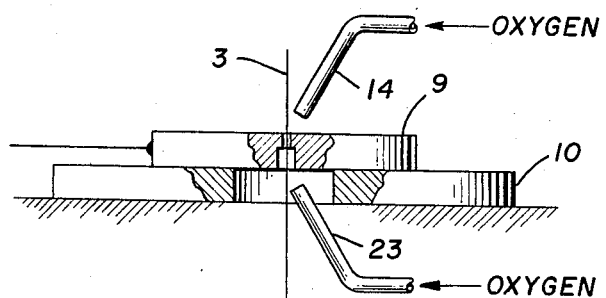
FIGURE 3 illustrates another modification of the apparatus.

FIGURE 3 illustrates schematically an alternate arrangement for improving oxygen utilization efficiency that in practice is slightly superior to the method illustrated in FIGURE 2 but does require more care and patience of the operator. A second hypodermic tube 23 delivering a second metered stream of oxygen is mounted under the precision table 10 to direct a jet of oxygen upward into the counterbore of the capillary being cut by the electrode 3. Preferably, the two oxygen streams to hypodermic tubes 14 and 23 are metered independently, tube 23 generally requiring only about one-half as much oxygen as tube 14 for efficient operation.

Figure 4:
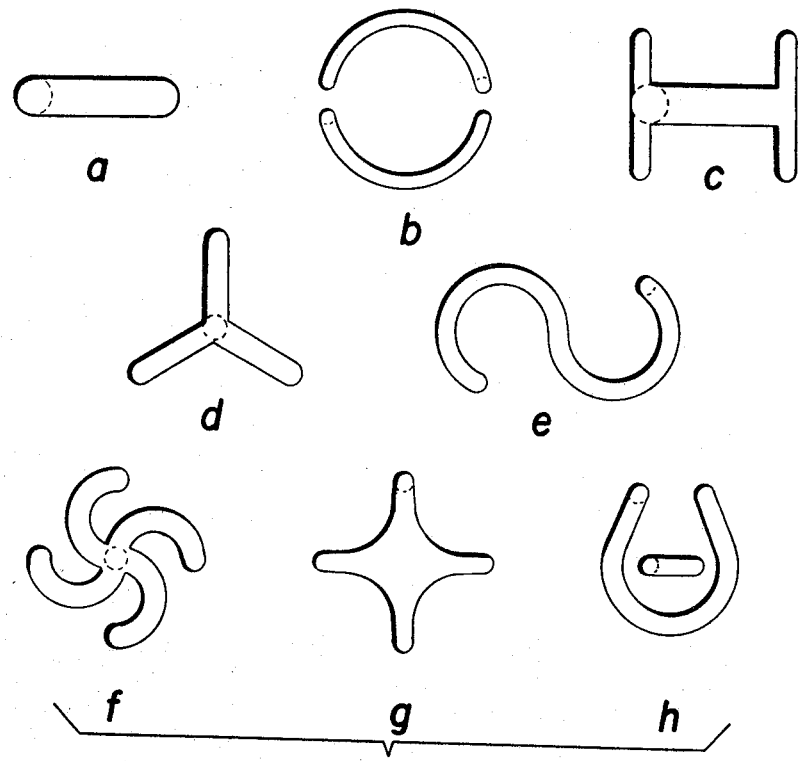
FIGURE 4 illustrates some shapes of various orifices that are readily made by the invention.

FIGURE 4 illustrates a number of cross sections of spinneret orifices that are readily made by the method of the invention. The dotted circle represents the position at which the pilot hole may be located for the initial stringup of the wire electrode through the spinneret blank. Curved boundaries of any arbitrary shape, as well as straight boundaries, are practicable. In general, one pilot hole must be drilled for any group of interconnected slots. A guide template of nonconductive material such as ceramic or, preferably, synthetic sapphire (alumina) may be used to assist the operative controlling movement of the spinneret relative to the electrode. For the Y-section capillary shown in FIGURE 4d, for example, a straight guide would be placed on top of the spinneret blank as indicated by numeral 15 in FIGURE 1; the operator then moves the spinneret periodically so that the electrode wire moves parallel to and lightly touching against the straight edge of the guide; the position of the guide is shifted to a new position as each of the three straight slots comprising the orifice are completed. A curved guide is used in like manner to make a curved boundary such as illustrated in FIGURE 4f. If a very large number of capillaries of the same type are to be made, it is preferable to omit the direct guide template and to use a mechanical movement duplication method, such as pantographic linkages, to move the spinneret in the desired path relative to the wire electrode.

Except as stated otherwise, all illustrative operational data given below were obtained with apparatus such as shown in FIGURE 1.

The following are examples of the practice of the present invention.

Since spinneret orifices are relatively small, in order to avoid inconvenient decimal fractions the mil (one one-thousandth of an inch) is frequently used for linear measure in the illustrations given below. By cycle is meant one complete stroke of the wire, while stroke length is the distance through which the wire moves in one direction during a cycle. To bring all data to a common basis, the metal removal rate is expressed in terms of the volume of metal removed per unit of time, specifically the number of cubic mils of metal removed per minute. The current is measured in milliamperes (ma.); and frequency is expressed in cycles per second (c.p.s.).

Figure 5:
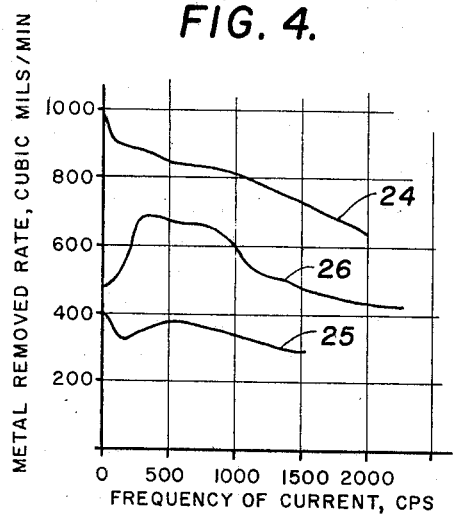
FIGURE 5 is a graphical representation of certain data given herein, which illustrates the effect of the frequency of the alternating local current upon the rate of removal of certain metals.

A commercial cylinder of oxygen was controllably connected to hypodermic tube 13 in FIGURE 1. A tungsten wire 4.8 mils in diameter comprised the electrode with the transformer set for a current of 450 milliamperes indicated by ammeter A. The spinneret material was type 430 stainless steel, 20 mils thick. The stroke length was 3.5 inches and frequency of the reciprocation of the wire was 226 strokes per minute. The oxygen flow rate was held constant at 7 liters per minute measured at 25° C. and one atmosphere of pressure. Straight slots were cut by electroerosion for 5 minutes using each of the frequencies of A.C. indicated in the tables below; the length of cut was measured; two 5-minute cuts were made at each frequency; and the average values were used to calculate the rates of metal removal presented below and shown graphically as line 24 in FIGURE 5. To show the importance of the use of oxygen, occasional cuttings were made with an equal flow of air only with the metal cutting rates being listed below in parentheses.

TABLE 1

| Frequency of A.C., c.p.s. | Rate of metal removal, cubic mils/min. |
| --- | --- |
| 0 (D.C.) | 1065 (665) |
| 60 | 910 |
| 100 | (400) |
| 250 | 880 |
| 600 | 860 |
| 1000 | 820 |
| 1500 | 740 |
| 2000 | 660 |

Type 430 stainless steel plate 20 mils thick was cut as above using the apparatus of FIGURE 1 and the same conditions except the current flow was set at 300 milliamperes. In Table 2 and shown graphically as line 25 in FIGURE 5, there is a listing of the rates of metal removal for various A.C. frequencies.

TABLE 2

| Frequency of A.C., c.p.s. | Rate of metal removal, cubic mils/min. |
| --- | --- |
| 0 (D.C.) | 420 |
| 20 | 400 (133) |
| 60 | 370 |
| 100 | (130) |
| 250 | 340 |
| 600 | 367 |
| 1000 | 340 |
| 1500 | 300 |

From the above data it is observed that with 430 stainless steel the cutting rate decreases quite rapidly with increasing frequency of the current for the first few hundreds of cycles and thereafter decreases more slowly. When air is used instead of oxygen, the cutting rate is much reduced. Observations of the eroded surfaces show that the surfaces become progressively rougher as the frequency is increased. Above a frequency of about 700 c.p.s. the wall finish becomes too rough for direct use as a spinneret for melt spinning without first polishing the wall thereof, although for other applications the surface can be used.

Type 316 stainless steel plate 20 mils thick was cut as above using the apparatus of FIGURE 1. It was found that type 316 S/S is electroeroded in a manner analogously to Type 430 S/S except that as in the use of direct current, Type 316 S/S is much more rapidly eroded. For example, Type 316 S/S stock 25 mils thick was electroeroded under similar conditions as above using 450 ma. current at 60 c.p.s. frequency with a metal removal rate of 1160 cubic mils/minute.

It is, therefore, desirable to use a low freqency current when electroeroding common stainless steel alloys in order to assure a sufficiently smooth wall finish concomitant with an acceptably high cutting rate. Frequencies beyond 700 c.p.s. are to be avoided because of roughness in wall finish. Of course, it is preferable to employ the lower standard frequency currents whenever possible because this eliminates the need of a frequency converter in the apparatus. The standard frequencies used in most industrialized nations of 25 c.p.s., 50 c.p.s. and 60 c.p.s. are quite suitable for direct use.

Not all materials are eroded most efficiently with very low frequency current. Therefore, in the practice of the invention herein described it is best to determine by preliminary trial the best combination of cutting rate and surface finish. The apparatus adapted for general use consequently will include a frequency converter. The electroerosion of titanium metal as to be described below illustrates the differences to be expected of metals other than stainless steel alloys.

Titanium stock, 20 mils thick was electroeroded with the apparatus of FIGURE 1 and under similar conditions those used in the previous examples. The current flow was set at 450 ma. In Table 3 and shown graphically as line 26 in FIGURE 5 there is a listing of rates of metal removal for various A.C. frequencies.

TABLE 3

| Frequency of A.C., c.p.s. | Rate of metal removal, cubic mils/min. |
| --- | --- |
| 0 | 480 |
| 60 | 500 |
| 150 | 540 |
| 250 | 620 |
| 600 | 670 |
| 700 | 665 |
| 1000 | 520 |
| 2500 | 433 |
| 10,000 | 133 |
| 20,000 | 130 |

In this example it is notable that the metal removal rates increase with increasing frequency up to about 500–600 c.p.s.; and the rate is thereafter reasonably constant until higher frequencies are attained. At the two highest frequencies set forth in Table 3 the rate had dropped to a negligible constant value. Again, however, wall finish because increasingly rough so that frequencies above about 700 c.p.s. are not suitable for making spinneret capillaries that can be used directly for melt spinning filaments without further finishing operations. It has been found that with titanium metal stock it is usually preferable to operate at lower frequencies of not greater than 200 c.p.s. because of the roughness problem, even though this requires sacrificing some of the possible increase in cutting rate.

The metal removal rate increases rapidly as the oxygen concentration is increased. The cutting rate becomes quite significantly increased at above 35% oxygen concentration. Atmospheric air nominally contains 21% oxygen by volume, and rather than a diluent such as nitrogen being used, air supplemented by 15–20% additional oxygen is preferred when a moderate cutting rate increase is desired. In the practice of the invention the local atmosphere at the active position of the wire electrode should contain at least 35% by volume of free oxygen and preferably 50–100% oxygen. Furthermore, the actual quantity of gaseous oxygen supplied to the active area of the electrode affects the cutting rate. Only a very small fraction of the total quantity of oxygen supplied is actually effectively used; but a large excess is needed to assure that sufficient oxygen is available at the spark site.

The rate of cutting by the method of the invention also depends upon the stroke length and speed of axial movement of the wire. In one extreme case, the stroke length might be less than the thickness of the metal being cut, while there appears to be no definite upper limit except as restricted by physical limitations. It has been found, however, that for practical use in spinneret production the stroke length should be no shorter than about one inch and preferably no longer than about 6 inches, the lower limit being the more important. The speed of axial movement of the wire is of great importance and is, of course, dependent upon the stroke length such that a higher frequency of reciprocation is required to achieve a given speed as the stroke length is decreased.

There is provided herein a novel apparatus for practical production of spinnerets with noncircular capillaries. Simultaneously with a great reduction in labor costs, a substantial improvement in quality of workmanship is achieved. It has been found that the process generally disclosed in application Ser. No. 553,369, filed May 27, 1966 can be operated effectively when alternating current of certain frequencies is substituted for direct current. The frequency of the A.C. used in the present invention should not normally exceed about 700 c.p.s. generally, preferably not greater than 200 c.p.s. Standard line frequencies of 60 c.p.s. or lower are preferred for obvious practical reasons unless the particular metal to be machined as exemplified by titanium, makes a higher frequency desirable.

Since many different embodiments of the invention can be made without departing from the spirit and scope thereof, it is to be understood that the invention is not limited by the specific illustrations herein except to the extent defined in the following claims.

What is claimed is:

1. A method of providing in a metal spinneret a capillary having branches comprising:
   (a) placing a small pilot hole in said spinneret;

(b) extending an electrically conductive wire through said hole;
(c) connecting each of the ends of the wire in parallel to one side of an alternating current electrical energy source having a frequency of 25–700 cycles per second and connecting the spinneret to the other side of the said electrical energy source;
(d) reciprocating said wire close to a portion of the inside surface of the pilot hole to provide a spark eroding discharge therebetween;
(e) establishing a stream of gas containing at least about 35% by volume free oxygen to the point of spark erosion; and
(f) moving the spinneret relative to the axis of the wire to provide for progression of the spark erosion, thereby cutting a branch in the spinneret extending from the pilot hole.

References Cited

UNITED STATES PATENTS

| | | |
|---|---|---|
| 76,191 | 3/1868 | Hinternesch. |
| 1,839,647 | 1/1932 | Combs _____ 143—70 |
| 2,592,894 | 4/1952 | Harding. |
| 2,635,487 | 4/1953 | Potter et al. |
| 2,906,853 | 9/1959 | Sibley. |
| 2,951,930 | 9/1960 | McKechnie. |

JOSEPH V. TRUHE, Primary Examiner

R. F. STAUBLY, Assistant Examiner

U.S. Cl. X.R.

143—70; 204—143